United States Patent [19]

Snow

[11] Patent Number: 5,039,136
[45] Date of Patent: Aug. 13, 1991

[54] STABILIZING FITTING FOR GASES AND FLUIDS

[76] Inventor: Joseph E. Snow, Rt. 2, Box 92, Puryear, Tenn. 38251

[21] Appl. No.: 471,653

[22] Filed: Jan. 30, 1990

Related U.S. Application Data

[63] Continuation of Ser. No. 160,009, Feb. 24, 1988, abandoned.

[51] Int. Cl.⁵ ............................................ F16L 113/02
[52] U.S. Cl. ..................................... 285/179; 285/61; 285/64
[58] Field of Search ........................... 285/61, 64, 179

[56] References Cited

U.S. PATENT DOCUMENTS

| | | | |
|---|---|---|---|
| 110,334 | 12/1870 | Bate | 285/64 |
| 185,075 | 12/1876 | Clapp et al. | 285/64 |
| 186,351 | 1/1877 | Leland | 285/179 |
| 1,115,696 | 11/1914 | Linbarger | 285/64 |
| 1,423,309 | 7/1922 | Curtis | 285/64 |
| 1,851,031 | 3/1932 | Baldwin | 285/179 |
| 2,773,708 | 12/1956 | Beyerle | 285/64 |
| 3,022,095 | 2/1962 | Mazeika | 285/61 |
| 3,474,810 | 10/1969 | Welsh | 285/64 |
| 4,307,901 | 12/1981 | Orberg et al. | 285/64 |

FOREIGN PATENT DOCUMENTS

| | | | |
|---|---|---|---|
| 1052898 | 4/1979 | Canada | 285/64 |
| 368583 | 2/1923 | Fed. Rep. of Germany | 285/179 |
| 4468 | 7/1898 | United Kingdom | 285/179 |
| 237675 | 8/1925 | United Kingdom | 285/179 |
| 2114694 | 8/1983 | United Kingdom | 285/64 |

Primary Examiner—Eric K. Nicholson
Attorney, Agent, or Firm—Walker & McKenzie

[57] ABSTRACT

The ability to stabilize pipes between the framing and finishing stages of construction projects is the primary function of my invention. The fitting is capable of being held in place by nails or screws passing through special appendage holes arranged to ascertain maximum strength. It is designed so that various standard plumbing and gas thread and socket patterns may be tooled during manufacturing to facilitate attachment to the inlet and outlet appropriate available pipe. It is designed so that several available materials such as brass and stainless steel could be used for manufacturing this fitting. This fitting would allow later installation or removal of through the surface piping in finishing or in case of accidents.

2 Claims, 1 Drawing Sheet

STABILIZING FITTING FOR GASES AND FLUIDS

This application is continuation of U.S. application Ser. No. 07/160,009, filed 02/24/88, now abandoned.

FIELD OF INVENTION

This fitting relates to the construction industry in the installation of plumbing and gas piping for stabilization of pipe and valves.

DISCUSSION OF PRIOR ART

Heretofore, plumbing and gas piping in construction projects was held in place at the rough-in stage by various means of crude time consuming wires, straps, and staples. By rough-in stage in this work I mean that point at which the frame work of the building is in place, but the finish wall and exterior cover material has not been applied. In the case of fire protection, ceiling cover material has not been applied. Some forms of rigid support that have been developed have not addressed the problem and later replacement of stub-outs used to pass through the finished wall or ceiling. One type fitting previously used the drop-eared ell had to have special support structures built to facilitate anchoring, adding to the cost of time and material. The principle difference in prior art and this fitting is its use of sideways anchoring instead of back anchoring as previously used.

OBJECTS

Accordingly several objects of my invention are its ability to anchor from the left or right of construction frame work. Its ability to facilitate removal of stub out pipes that might need changing due to leaks, changes in plans, or accidents that occur during finishing or remodeling. Because of the scope of this request for patent rights the list of inlet and outlet combinations is not limited to so few combinations as would handicap any trade. As shown in the installation figures the fittings are not limited to the construction industry, but have application in the irrigation, animal husbandry, and recreation fields. This fitting also lends itself to many possible types of material compositions because of its simple design. Further objects and advantages of my invention will become apparent from a consideration of the drawings and ensuing description thereof.

DRAWINGS

FIG. 1 is a left view of my invention showing the the holes through which nails or screws would be placed to hold the fitting in place. It also shows one of the many possible inlets suitable for attachment, in this case ½" iron pipe thread.

FIG. 2 shows the front view of my invention. It allows one to see the outlet port. This port can be several different standard patterns i.e. ¼, ½, ⅜, ¾, 1" female iron pipe thread. It also shows the flat sides used to steady the fitting. This figure shows the attachment protuberences top and bottom and as indicated where the nail or screw would enter and pass through.

FIG. 6 is a bottom view showing the inlet port through which incoming gases and liquids will enter and is a cross section view of the fitting, it shows the inside thread and the path material will follow as it passes through.

DESCRIPTION

The physical structure of my invention is very simple. The basic shape is that of a 90 degree turning channel The diversity of inlet and outlet ports is listed in the accompanying CHART 1 of this disclosure.

Figure 1:
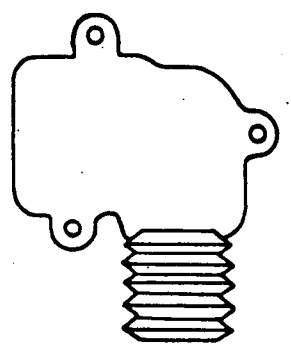
Figure 2:
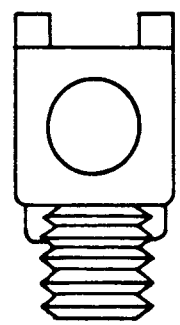
Figure 3:
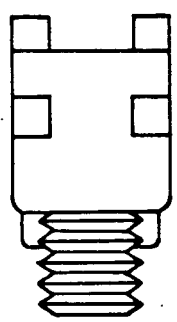
FIG. 3 is the back or rear view of the fitting showing the back attachment point and also the flat side used to aid stability. The top attachment point is shown from this point of view.
Figure 4:
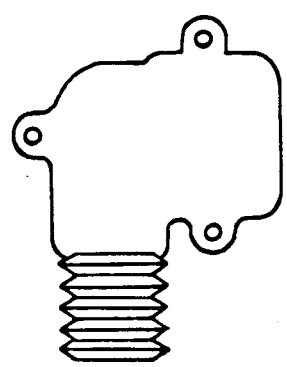
FIG. 4 shows the reverse of FIG. 1. It shows holes and one possible inlet port.
Figure 5:
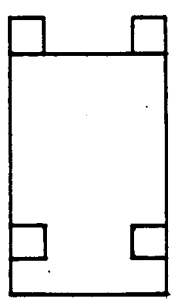
FIG. 5 shows the top view with its top and back attachment points and flat front face.
Figure 6:
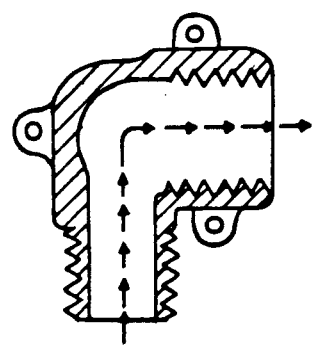

The sides of the fitting body are flat with the inlet port on bottom slightly inset to make room for whatever means of attachment a particular type pipe would necessitate. The protrusion at each of six locations are placed in pairs on the top right and left side, back right and left side, and lower body right and left side. The three points of attachment are inclusive guides and restraints. The material out of which these fittings may be made are listed in CHART 2 which accompanies this patent application. The FIGS. 1-6 that accompany this application show clearly the above and previously described fitting. This description is only a verbal representaton of my invention and so may be limited to verbal skills that are not intended to be the sole limiting factors involved in this fitting.

OPERATION

The working function of my fitting is to hold in place pipes used in plumbing and gas deliverys systems. A person wishing to secure any pipe to a part of the of some stability has only to pick the appropriate fitting for the pipe used and with the proper outlet thread. They must then attach that pipe to the fitting and then the fitting to the stable structure. For example, if a plumber were bringing a copper pipe into a framed wall during construction, he would choose a fitting with a sweat inlet port and a ½" female iron pipe thread outlet port. He would sweat the copper to the inlet and then nail or screw the fitting to a site on the framework to supply a proper source for water supply after the wall is complete. Likewise, and gas pipe installer would choose for example a fitting with a ½" female iron pipe thread, screw it on to their pipe protruding inside the wall and then attach it to a part of the frame with screws or nails to part of the frame of the structure. The choice of proper fitting inlet and outlet would depend on codes and procedures to extensive to be listed here. Referral to CHARTS 1-2 will show the possible choices of fitting and material.

While the above description contains many specificities, these should not be construed as limitations on the scope of the invention, but rather as exemplification of a few preferred embodiments thereof. Many variations are possible, for example plastic pipe made from polybutylene could be crimped to my invention and nailed or screwed to a ceiling joist to provide a stable place to later screw an emergency fire sprinkler head in a residence or motel. Accordingly, the scope of the invention should be determined not by the embodiment illustrated, but by the appended claims and their legal equivalents.

CHART 1

| INLET OPTIONS | | | |
|---|---|---|---|
| ½" male iron pipe thread | • | | |
| ½" female iron pipe thread | • | | |
| ¾" male iron pipe thread | • | • | • |

CHART 1-continued

| | | | |
|---|---|---|---|
| ½" female iron pipe thread | | • | |
| ⅜" male flare thread | • | | |
| ½" male flare thread | • | | |
| ⅝" male flare thread | • | | |
| ¾" male flare thread | • | • | |
| ⅜" crimp polybutylene | • | | |
| ½" crimp polybutylene | • | | |
| ¾" crimp polybutylene | • | • | |
| ½" c.p.v.c. socket | • | | |
| ¾" c.p.v.c. socket | | • | |
| ½" copper tube socket | • | | |
| ¾" copper tube socket | • | • | |
| 1" copper tube socket | | • | • |
| OUTLET OPTIONS | ½" female iron pipe thread | ¾" female iron pipe thread | 1" female iron pipe thread |

CHART 2

MATERIAL OUT OF WHICH THIS FITTING MIGHT BE PRODUCED

BRASS
ACETYL-COPOLYMER
STAINLESS STEEL
COPPER
IRON
C.P.V.C.
NYLON
P.V.C.

I claim:

1. A pipe fitting for coupling a pressurized fluid inlet pipe to a stub-out pipe during the rough-in stage of a construction project and for stably securing said pipes to a flat surface portion of a building support member; said pipe fitting comprising:

a) an integral, one-piece body member having an inlet port for receiving said pressurized fluid inlet pipe, having an outlet port for receiving said stub-out pipe, and having a passageway extending between said inlet port and said outlet port for allowing pressurized fluid to pass from said pressurized fluid inlet pipe to said stub-out pipe through said body member in a fluid-tight manner, said passageway having a 90 degree bend between said inlet port and said outlet port; said passageway having a first passageway portion extending between said outlet port and said 90 degree bend and having a second passageway portion extending between said inlet port and said 90 degree bend; said body member having a flat first side and a flat second side for allowing said body member to be sideways anchored to said support member with either one of said flat first and second sides thereof positioned against said flat surface portion of said support member; said flat first and second sides of said body member being spaced from and planar to one another; the plane of said flat first and second sides of said body member being parallel to the longitudinal axis of said first passageway portion of said passageway of said body member; and b) securing means for securing said body member to said support member with either one of said flat first and second sides of said body member engaging said flat surface portion of said support member; said securing means having a plurality of apertures, the longitudinal axis of each of said plane of said flat first and second sides of said body member. apertures of said securing means being perpendicular to the 2. The pipe fitting of claim 1 in which said securing means includes a plurality of ear members attached to said body member, each of said ear members having one of said apertures of said securing means therethrough.

* * * * *